United States Patent [19]

McClay, Jr.

[11] 3,824,696

[45] July 23, 1974

[54] MULTIPLE GAUGING DEVICE

[76] Inventor: Alexander W. McClay, Jr., 1679 Brandon Ave., Petersburg, Va. 23803

[22] Filed: Sept. 8, 1971

[21] Appl. No.: 178,750

[52] U.S. Cl. .............................. 33/137 R, 33/138
[51] Int. Cl. ............................................. G01b 3/10
[58] Field of Search...... 33/137 R, 138, 107 R, 173, 33/161, 174 G, 174 B, 197

[56] References Cited
UNITED STATES PATENTS

| | | | |
|---|---|---|---|
| 2,256,676 | 9/1941 | Iverson | 33/173 |
| 2,373,338 | 4/1945 | Rakauskes | 33/173 |
| 2,799,942 | 7/1957 | Ehler | 33/173 |
| 3,390,461 | 7/1968 | Anderson | 33/138 |
| 3,406,456 | 10/1968 | Schleich | 33/107 R |

Primary Examiner—Louis R. Prince
Assistant Examiner—Steven L. Stephen
Attorney, Agent, or Firm—Wilfred G. Caldwell

[57] ABSTRACT

For use in laying out duct or box like structures, a gauging device in the form of a plate, with a slot, of appreciable width, lying preferably along the longitudinal centerline thereof, including spanning brackets and locating marks in predetermined positions, with rotatable connection means for attaching the gauge to a measuring tape (or it may be integral with a measuring bar), with the spanning brackets and locating marks serving to position the tape or bar so as to add several predetermined lengths to the tape or bar equivalent to the material lapped or cut away in the fabrication of corner or lap joints or seams with the tape or bar indicating directly in terms of the specified, or finished, inside dimensions of the structure. The spanning brackets are designed to enable the user to position the gauge over a point within or defining a groove by positioning the gauge directly over the intersection, or intersections, of a depending plane and the upper surface of the material being fabricated.

2 Claims, 14 Drawing Figures

INVENTOR
ALEXANDER W. McCLAY, JR.
BY Wilfred G. Caldwell
ATTORNEY

MULTIPLE GAUGING DEVICE

The present invention relates to an invention of the category of various embodiments disclosed in the pending U.S. Pat. application Ser. No. 53,951; filed July 10, 1970, by the same inventor.

The present invention relates to gauging devices, in the preferred embodiment a rectangular plate containing a slot, lying along its longitudinal centerline, for sighting therethrough, and, including spanning brackets, locating marks, and certain diagrammatical data on its upper and reverse sides, which may be used in rotatable (around its longitudinal axis) attachment with a measuring tape, or rigidly attached to a measuring bar.

The gauging device has the capacity to add several dimensions to the length of the tape, or bar, when measuring horizontally or linearly from, e.g. a mark or point on a (horizontal) surface, from a dependent vertical face, or from a point within a groove.

The several dimensions are those allowances made in the layout and subsequent cutting of flat stock, of appreciable thickness, for the fabrication of air ducts, conduits or rectangular cross-section, boxes, or box-like structures when the sides of the structures are joined by means of rabbet, butt, mitre, and ship-lap type joints, the devices adding certain predetermined lengths to the measuring tape, or bar, to compensate for the material lapped or cut away and also for the cutter-to-guide-edge width of the cutting tool, in order that the measuring tape, or bar, may directly indicate the guide-edge position for each subsequent cut in terms of the finished, or specified, inside dimensions of the structure.

The invention finds wide-spread use in the layout and cutting of fiber glass duct board manufactured for the fabrication of ducts for air conditioning systems. The material is usually an insulating board, faced on one side with a thin aluminum sheet which serves as a structural band to hold the sides of the duct together, and also as a vapor barrier. The board is customarily manufactured in three thicknesses, one, one and one-half, and two inches. The thicker materials, of course, require greater seam allowances, and three different size layout devices are required when working with the three thicknesses, each similar except in length, size and longitudinal placement of the spanning brackets, longitudinal placement of the locating marks, and the numerical data on the sides thereof, but the operating principle being the same.

In a typical example the corner joints of a section of duct are cut across the board, parallel to the short side (normally four feet), and if the length (normally ten feet) of the board is sufficient, the joints for the four corners are cut. The two end cuts are then fastened together to form the finished section, the duct having been made, in this instance from one continuous piece, in the following manner:

The board is placed on a work table with the aluminum facing next to the table. The first cut is made by a knife vertically through the board, including the aluminum facing (note, this cut is not necessary if the edge is in "as manufactured" condition). The next cut is a knife cut through the fiber glass but not through the aluminum facing, and spaced to the left of the beginning edge a distance as necessary to later become a stapling flap. The next three cuts are grooves formed, in a first instance, by the intersection of two 45° mitre faces forming at the bottom of the groove an included angle of 90° with its vertex located slightly above the aluminum facing, and in a second instance by a modified ship-lap groove, which will be explained later. The last cut is made with a knife, through the board including the aluminum facing (an edge so made will hereinafter be termed a butt edge).

Next, the fiber glass between the beginning edge and the first pertinent knife cut is separated from the aluminum facing to form the stapling flap. Then, the vertical face thus left adjacent to the stapling flap, is now cut with a special tool which forms a rabbet cut along the edge and the upper surface of the board, thus completing the layout and cutting to form the duct.

At this point, all that is necessary to form the duct is to bring the first side up to a vertical position, the same for the third side, the fourth side is swung up and over to mate its butt edge into the rabbeted edge of the first side, bend the tab over the corner thus formed, staple it down (to the outside face of the fourth side) and seal the edge of the tab with a special tape.

The first three corner joints formed in the above are termed mitre joints and the fourth, and last, corner joint is termed a modified ship-lap joint.

However, before the board is folded to form a duct, a rabbeting tool is moved along one of the edges normal to the corner seam cuts, cutting a rabbet out of the top surface of the board; a second rabbeting tool is moved along the opposite edge of the board to cut a rabbet in the bottom surface of the board, just above, and adjacent to the aluminum facing. These latter cuts form the male and female edges of ship-lap joints used to join one section of duct to another.

In order to facricate ducts of large cross-sectional area, and also, in order to reduce waste, it becomes necessary, rather than making the duct from one continuous piece of board, as described above, to make the duct from four separate pieces, or of two "L" sections, or by means of a "U" section and a cap piece.

Air conditioning duct sizes are always given, or specified, in terms of the inside width and depth dimensions which if not otherwise qualified, shall be, herein, construed to mean only the width of a side, top, or bottom panel of a section of duct, or of a duct fitting (or the width of a cutting tool measured in this same direction and in this instance, insignificant width defines, e.g. the thickness of a knife blade, whereas significant width means the width of the material lapped or removed in forming a joint, or more). With this in mind, and in view of the fact that all but one of the above joint cuts affect the inside dimensions, and also mindful that continuous corner joints are formed by a groove cut and that non-continuous corner joints are made up of a rabbeted edge, a mating butt edge, and a stapling tab, and again mindful that, thus far in the interest of simplicity of description, nothing has been mentioned regarding the layout of elbow and tee fittings; it becomes quite apparent that the dimensional allowances that must be made, to compensate for the material lapped, or cut away, etc. are many and varied.

In addition to the above, it must also be determined whether the remaining board, or potential scrap, is large enough for the fabrication of ducts, to desired sizes, by means of joining two "L" sections, or by joining a "U" section with a cap piece, or by joining four separate pieces, or ideally, in one piece, as outlined above, the required length of board being, of course, the total of the pertinent side dimensions plus the total of the pertinent seam allowances.

The first method of coping with the above, as set forth by the manufacturers of duct board, was called the "guide-edge method" and was sufficiently complicated that one of the manufacturers of the board, had work-sheets printed, and suggested their use to the contractor, the work sheets being used to calculate the various positions of a guide edge relative to the beginning edge of the board.

According to one of the board manufacturers fabrication manuals, contractors, using the board, found the above-mentioned method unnecessarily complicated and developed a method called the "center-line method." This is the method now in use, and briefly, is as follows: dimensioning is begun at either the left or right hand side of the board, the dimension of the first side is added to the seam allowances associated therewith and this totaled dimension is marked off along the edge (originally the 10' edge) of the board. This procedure is repeated for each side, with each measurement being marked off from the prior mark, and again repeated along the opposite side of the board. Using a straight edge, lines are then drawn across the board from each mark to the corresponding mark on the opposite side and, if marked off properly, these lines will be the center-lines of the subsequent cuts. The center of the grooving tool is marked on top of the leading edge, and the cuts are then made free-hand, lining up the mark on the tool with the line on the board. (There are two problems here: one is that, due to the abrasive nature of the material, the workman spends an appreciable amount of time sharpening pencils; the other is that the mark on the grooving tool being about an inch above the line on the board, if the workman's line of vision is not exactly normal to the board the cut is not accurately made, and this, when the board is folded to become a section of duct, causes the corners of the duct to be "out of square," which, of course, causes difficulty when joining one section of duct to another, and particularly when the adjacent section is out of square in the opposite direction.)

The invention herein described, reduces all of the above to a very simple, straight-forward, and accurate procedure even for the inexperienced.

The gauge is attached to a measuring tape in one embodiment, as mentioned earlier. The tape is merely a spring return type with capacity to measure 6 to 8 feet. The housing of the tape is mounted in such a way that it may be removably carried on the blade (straight-edge portion) of a T-square.

In using the present invention, the board is placed on the cutting table with its aluminum facing against the table. The blade of the T-square is placed across the duct board (in the direction in which the corner seams are to be cut), and with its head bearing against the long side of the table adjacent to the worker. It is now only necessary to properly position the gauge at the right hand edge, or at the immediately preceding cut to the right of the T-square, as the case may be, move the T-square to the left until the right hand edge of the blade coincides with the measurement (i.e., the desired inside dimension of that side of the duct) as indicated on the tape, and the blade is in the correct position to provide the guide edge for the subsequent cut.

On each side of the gauge are shown certain diagrammatical data which generally depicts the sides of the duct in stretchout cross-section. The portions of these sections containing diagonal lines, circular marks with lines extending therethrough to spanning brackets, or to locating marks, represent the sides having those particular combinations of corner joints for which the correct lengths are added, to that shown by the tape, by positioning the indicated spanning bracket, or locating mark, at the immediately preceding groove cut, or knife cut, or butt edge, as the case may be. This will be explained in greater detail in reference to the drawings.

Also, in the diagrammatical data, in addition to the above cross-sections containing the diagonal lines, which are used as above indicated, there are cross-sections which are shown in outline only. These are included only for information as to the length of board, in addition to the dimension, or sum of the dimensions, respectively, of the side, or combination of sides, required to cut said side, or combination of sides including the related combinations of corner seams. This will also be further explained in connection with the description of the drawings.

With the foregoing in mind, it is among the objects of the invention to provide apparatus for gauging purposes wherein, in connection with a linear measuring arrangement, the present invention directly adds any of several predetermined dimensions to the scale of the linear measurer when measuring from points on each of several variously oriented planes.

Another object of the present invention is the provision of a measuring gauge, per se, which has a body and appendages related thereto in predetermined fashion.

It is another object of the invention to incorporate such a gauge with a marked bar or linear extendable measuring device.

Yet another object of the invention is the provision of apparatus incorporating the use of the invention in conjunction with a T-square or straight edge for laying out duct and duct fittings to desired inside dimensions.

Finally, a still further object is the provision of a gauging device using the desired principle which device is simple, straight forward, accurate, and readily useable by the inexperienced.

The invention will be better understood from a reading of the following detailed description thereof, when taken in the light of the accompanying drawings wherein:

FIG. 4 shows, in the upper right portion, the gauge positioned over a first knife cut, Immediately therebeneath (in FIG. 5) is shown a cross-section of the duct board showing that this knife cut is later to become a rabbeted edge with an adjoining stapling flap, To the left of the gauge, in FIG. 4, is shown the attached measuring tape, and guide-edge being positioned for a first groove cut, Below this position, in FIGS. 5 and 6, is shown the gauge with its spanning bracket located over the first groove cut as it would be in positioning the guide edge for a second groove cut;

Figures 1, 2, 3:
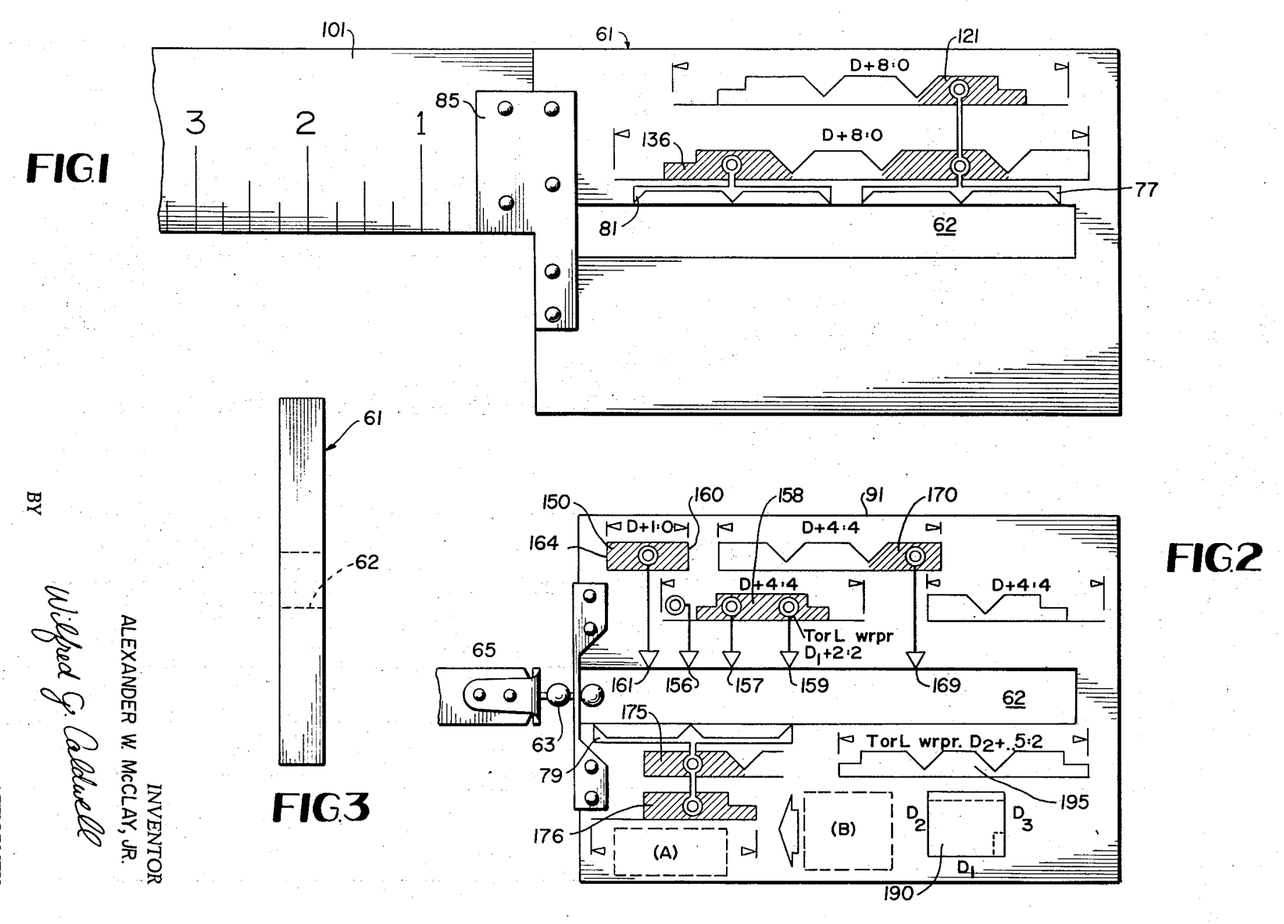
FIG. 1 is a plan view of a first side of a gauge showing the means of attachment to a combination measuring bar and straight edge.
FIG. 2 is a plan view of the reverse side of the gauge of FIG. 1, and showing the means of attachment to a measuring tape.
FIG. 3 shows the end view of the gauge.

In FIG. 1, a first embodiment of the gauge 61 is shown as a first side of the gauge and means of attachment 85 to a combination straight-edge and measuring bar 101, made of a material suitable, and of sufficient thickness, to provide a guide-edge for standard cutting tools. The attachment 85 may be by means of two plates, one on either side and riveted therethrough, or by any other convenient means, setting the spanning brackets and locating marks in predetermined longitudinal locations relative to the "0" inch mark on the measuring means.

The slots 62, through the gauge 61, is centered approximately along the extension of the graduated edge of the measuring bar, and is of sufficient width to provide convenient sighting therethrough in order that the locating mark on the gauge may be placed in proper alignment with a knife cut, groove, or edge of the duct board, from which the next measurement is to be laid off. Above the slot, and immediately adjacent thereto, are shown two spanning brackets, 77 and 81, each with its end and center points clearly delineated. From the center of the bracket 81 is a line extending vertically upward to a cross-hatched section 136 of one side of, as shown hereon, a four side continuous string stretchout. When the ends of the spanning bracket are positioned over the intersections of each of the two sides of the groove with the top surface of the board, the measuring means will be correctly positioned so that it will indicate the position of the guide-edge, for the next cut, in terms of the required inside dimension of the duct, as formed by a side thereof having the same combination of corner seam cuts and in the same sequence, right to left, as that shown in the cross-hatched section 136 above the bracket. It is to be noted that in the above instance, the guide-edge is being positioned for a cut that will be made with a knife, a tool of insignificant width, and therefore the above spanning bracket 81 positioned the measuring means so as to allow only for the material lapped, and for the material cut away.

However, with regard to the spanning bracket 77 to the right of that described above, it will be noted that the upper cross-hatched section 121 over this racket contains the same combination of corner seams as did the former but in a reversed sequence, thus making it necessary to position the measuring means in a manner such that it will in turn position the guide-edge, for the subsequent cut, at a point which will allow for, not only the material lapped and also that cut away, but also for the center-to-guide-edge width of the grooving tool. To position the gauge, in laying out a side having the same corner joints, and in the same sequence, as that shown in the upper cross-hatched section, the center point of the spanning bracket 77 is positioned over the mark made by the knife cut, later to become the right hand vertical portion of a rabbeted edge.

To position the gauge, in laying out a side having the same combination of corner joints as that shown in the lower cross-hatched section, namely a side lying between two groove cuts. The extremities of the spanning bracket are positioned directly above the extremities of the groove from which the next measurement is to be taken.

The three cross-hatched sections referred to in the above description, are shown hereon as parts of two continuous strings of sides, the upper string of three sides and two stapling flaps making up a "U" section, the lower string of four sides, making up a complete duct section, and those sides with which the above layout procedure is not concerned being shown in outline only. Above each of these stretch-outs are dimension lines indicating that the length of the string, in each of these instances is "D + 8:0"; which is to indicate that the total material required to cut either of these strings will be the sum of the required inside dimensions of the duct, or portion thereof, "D," plus eight inches. In the notation "8:0," the second of these two figures will herein indicate eighths of an inch, e.g. D + 4:4 will indicate that the total material required will be the sum of the required inside dimensions of these sides of the duct (D), as shown in the diagram, plus four and four-eighths inches.

While this embodiment of the gauge, integrally connected with a combination linear measurer and straight edge, may be used in the lay-out of sections of duct, its primary use will be found in the lay-out and cutting of the components of duct fittings such as elbows, tees, transitions, and the like. In the interests of brevity and simplicity, further explanation regarding this aspect will be avoided.

In FIG. 2, a second embodiment of the gauge 61 is shown as the reverse side of the same gauge, but showing rotatable connection means 63 linking the gauge to a measuring tape 65. It will be understood that either embodiment incorporates the front and back configurations and notations of FIGS. 1 and 2, the difference in embodiments residing in the type measuring means and manner of connection of the gauge.

On the face of the gauge, above the slot 62 (FIG. 2), and beginning from the left, there is shown a first locating mark 161, or arrow point, with a vertical line extending therefrom to a cross-section of a side 150 having two butt edges (160 and 164). Above the cross-section are shown dimensioning arrows with the dimension "D + 1:0" indicating that the total material needed to cut this side would be the inside dimension of that side of the duct, or duct fitting, plus one inch. In cutting the side 150 (FIG. 2), the guide-edge 33 (FIGS. 4, 6, 7 and 8) is positioned by placing the locating mark directly over the beginning, or right hand edge 160 (FIG. 2) of the board, the blade 34 (FIG. 8) of the T-square 35, carrying a spring return type reelable measuring tape 65 and its housing 67 moved to the left until its right hand edge 33 coincides with that measurement, as indicated on the tape, corresponding to the desired inside dimension of the duct formed by that side.

The next locating mark 156 (FIG. 2), to the right of the above, is shown with a vertical line extending to a stapling flap. If the stapling flap is to be along the left hand edge of the adjacent section, as shown in this diagram, the locating mark is placed directly above the mark made by the prior knife cut, that cut which formed the left hand vertical portion of the adjacent rabbeted edge, and, as the stapling flap forms no part of an inside duct dimension the guide-edge is positioned at the "0" inch point on the measuring tape and the cut made. If the stapling flap is to lie along the right hand edge of the adjacent section, as shown to the right of the section in this diagram, the procedure is the same except that the mark is placed over the right hand, or beginning, edge 29 (FIG. 8) of the board and the subsequent knife cut made through only the fiber glass portion of the board, leaving the aluminum facing portion intact.

Immediately to the right of the above is a third locating mark 157 (FIG. 2) shown with a vertical line extending to a cross-section of a side 158 lying between two rabbeted edges. In cutting this side, this locating mark is placed above the mark made by the knife cut which formed the right hand vertical portion of the rabbeted edge to the right of the section. The blade 34 of the T-square 35, carrying the measuring tape 65, is moved to the left until the dimension, as indicated by the tape, corresponding to that inside dimension of the duct formed by this side, coincides with the guide-edge side 33 of the blade 34. A knife cut is then made along the guide-edge, through the fiberglass portion only, of the duct board, thus forming the left-hand vertical portion of the rabbeted edge to the left of the section. After the fiber glass lying above the two stapling flaps is removed, a special rabbeting tool is moved along the two above described knife cuts, thus completing the two rabbeted edges.

To the right of the foregoing mark is a fourth locating mark 159 (FIG. 2) with a vertical line extending therefrom to the same cross-sectional diagram 158 referred to in the above description; however, there is a note shown pertaining to this mark, indicating that it is used only when laying out and cutting tee or elbow wrapper pieces, (and that such pieces do not have stapling flaps adjacent to the rabbeted edges, and also that the material required, in the direction normal to the rabbeted edges is $D_1 + 2:2$," or, the corresponding dimension of the duct $D_1$, entering the fitting, plus 2¼ inches. The significance of "$D_1$" will be pointed out later.) Above the section and including the stapling flaps, are dimensioning arrows and the dimension "$D + 4:4$," indicating that the material required to cut the side will be the inside dimension of that side of the duct formed by the piece, plus 4 4/8 inches.

Again, and to the right, is shown a fifth locating mark 169 (FIG. 2), with a vertical line extending therefrom to a side 170 of a duct, shown in cross-hatched section, lying between a butt edge and a groove. The mark is placed above and in alignment with the butt edge, the beginning edge, and the side is laid off and cut as in the foregoing descriptions. Shown to the left of the above section, and attached thereto, are two sections shown in outline only, the three sections making up a "U" section, with butt edges as the terminal edges. Above this stretch-out of three attached sides is shown the dimension "$D + 4:4$" indicating that the total material required for the three sides will be the sum of the required inside dimensions of the sides plus 4½ inches. It will be noted that a "U" section is also shown in FIG. 1; however, in the latter case the terminal edges are rabbeted with adjoining stapling flaps, requiring in total material the sum of the inside duct dimension of the pertinent sides plus 8 inches.

To the right of the prior showing is an "L" section, shown in outline, and it is shown merely to indicate that the total material required is the sum of the inside dimensions of this combination of sides plus 4½ inches.

Below the sighting slot 62 and in the left portion of the gauge is shown a third spanning bracket 79 (FIG. 2) with a vertical line extending therefrom to two cross-hatched sections 175 and 176. The upper of the two, 175, being a side of a duct, or duct fitting, and the lower, 176, part of a fitting. In positioning the guide-edge for cutting the side 175, the ends of the spanning bracket 79 are placed directly above the upper edges of the groove, for the lower of the two, the center point of the spanning bracket is placed directly above the right hand edge of the board, thus positioning the measuring tape, and therefore the guide-edge, for the subsequent butt edge cuts. Below the lower of these two sections, and relating thereto, are dimensioning arrows between which is shown certain informational data. The dashed line block identified by (A) at the lower left of FIG. 2 is provided for the information as follows: L filler $D_2 + 2:6$ (three flaps) and indicates by the measuring markers to either side of this block that the piece immediately above is an L filler piece and the required material is the nominal duct dimension $D_2$ plus 2 and 6/8 inches and that three stapling flaps are required. Similarly the dashed block bearing the notation (B) which points to the L filler piece should bear the following information: Cut T filler same as L filler except subtract $D_2 - D_3 - 1:0$ (only two flaps).

In the lower right hand corner is shown a plan view of a tee fitting 190 (FIG. 2) with the designations $D_1$, $D_2$, and $D_3$, representing the edges along which ducts 1, 2, and 3, are connected. The fitting is made up of a continuous string of three sections as shown immediately above, folded to form a "U" section, the top dotted line in the plan view 190 representing the sum of the required inside dimensions of the sides plus 4½ inches. It will be noted that a "U" section is also shown in FIG. 1; however, in the latter case the terminal edges are rabbeted with adjoining stapling flaps, requiring in total material the sum of the inside duct dimension of the pertinent sides plus 8 inches.

To the right of the prior showing is an "L" section, shown in outline, and it is shown merely to indicate that the total material required is the sum of the inside dimensions of this combination of sides plus 4½ inches.

Below the sighting slot 62 and in the left portion of the gauge is shown a third spanning bracket 79 (FIG. 2) with a vertical line extending therefrom to two cross-hatched sections 175 and 176. The upper of the two 175, being a side of a duct, or duct fitting, and the lower, 176, part of a fitting. In positioning the guide-edge for cutting the side 175, the ends of the spanning bracket 79 are placed directly above the upper edges of the groove, for the lower of the two, the center point of the spanning bracket is placed directly above the right hand edge of the board, thus positioning the measuring tape, and therefore the guide-edge, for the subsequent butt edge cuts. Below the lower of these two sections, and relating thereto, are dimensioning arrows between which is shown certain informational data, which will be referred to later.

In the lower right hand corner is shown a plan view of a tee fitting 190 (FIG. 2) with the designations $D_1$, $D_2$, and $D_3$, representing the edges along which ducts 1, 2 and 3, are connected. The fitting is made up of a continuous string of three sections as shown immediately above, folded to form a "U" section, the top dotted line in the plan view 190 representing the center section of the stretch-out, and the dotted line shown in the lower right corner representing a filler piece which is used in the event that the duct $D_3$ is of a lesser horizontal dimension as compared with the duct $D_2$. In making an elbow fitting, the filler piece, referred to above, is cut so that it closes the opening at $D_3$. In the interests of simplicity, further explanation regarding the lay-out, cutting and structure of duct fittings will be avoided.

It will be understood that the spacing of the arrows and dimensional data changes for each board thickness. The example presented is for insulating board of 1 inch thickness.

Figure 4:
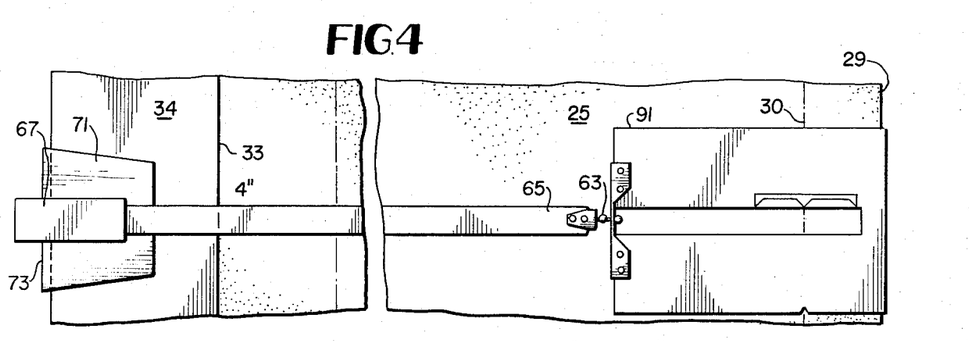

In FIG. 4 is shown, in operative layout, the gauge 91 of FIG. 2 together with its attachment 63 to the measuring tape 65, the spring return tape reel housing 67, and the reel housing mounting plate 71. The reel housing and mounting plate is shown atop a partial showing of the T-square blade 34, with the depending flange 73, the dotted line indicating its face, hooked over the left hand edge of the blade 34, in which manner, as the T-square is moved to the left, the measuring tape reel is automatically moved therewith. In this figure is shown the pertinent steps in the lay-out for cutting of the four longitudinal corner seams of a section of duct which is to be made from a four side continuous string stretch out. As the use of various locating marks, and spanning brackets on the gauge, and also the diagramatical data relating thereto, has been previously explained in some detail, further reference will assume that the selection of the locating mark or spanning bracket will be in accordance with the foregoing, and further explanation will be avoided.

In the upper portion of the figure (FIG. 4) is shown the right hand, or beginning edge 29 of the duct board 25, in plan view, with a dotted line 30 parallel to and to the left thereof, representing the mark on the board made by a knife cut, the first cut in the procedure. As this first cut was made so that a stapling flap might later be left along the beginning edge 29, the locating mark 156 (FIG. 2) (stapling flap) on the gauge was located over the beginning edge of the board, the blade of the T-square moved to the left until the guide-edge coincided with the "0" inch point on the tape, the gauge and tape allowed to fall to the left of the blade of the T-square and the knife cut subsequently made through the fiber glass portion of the board but not through the aluminum facing.

Figure 5:
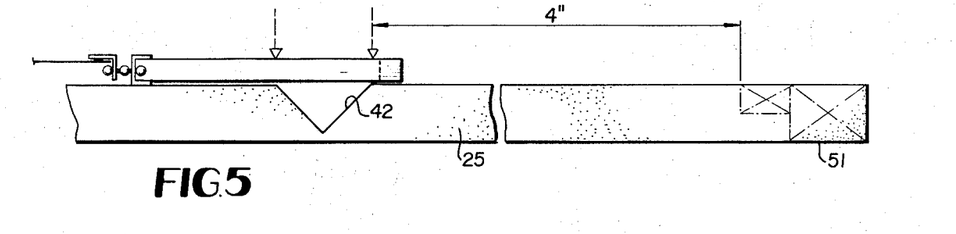
Figure 6:
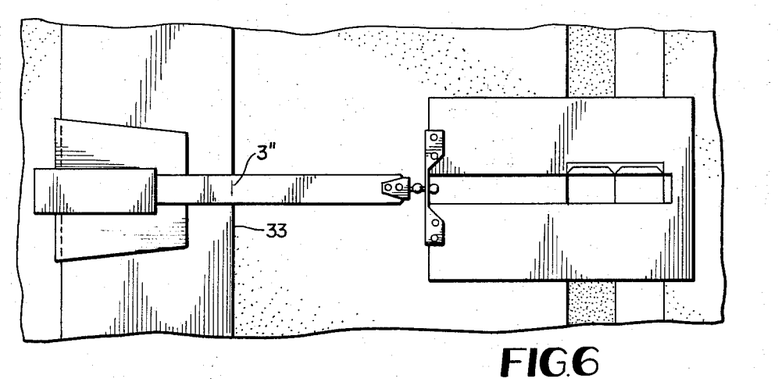
Figure 7:
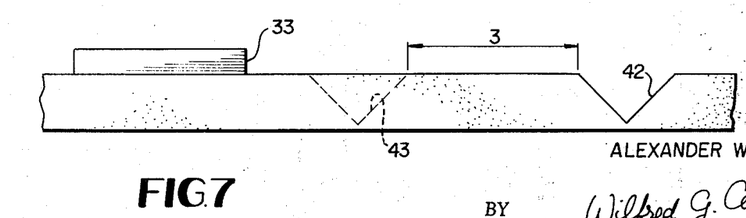
FIG. 7 is a section through the board showing the first and second groove cuts.

Immediately below the plan view is a cross-section (FIG. 5) of the board, showing the knife cut represented by a vertical dotted line extending from the top of the board to a point just above the aluminum facing. Also, shown in the cross-section are two rectangular areas crossed by dotted diagonal lines, one on either side of the above knife cut, which represent the fiber glass removed, as last operation cuts, to form the rabbeted edge with its adjacent stapling flap.

In the same plan view, the gauge 91 is shown with the center point of the appropriate spanning bracket located directly above the mark of the above knife cut, thus setting the position of the tape for measurement from said mark, later to become a rabbeted edge, to the guide-edge position for a first groove cut. The T-square is moved to the left until the inside dimension of the duct, which is to be formed by the side, in this instance four inches, as indicated by the tape at the point at which it coincides with the right hand edge, the guide-edge, of the T-square. The grooving tool 38 (FIG. 8), when moved across the board and in contact with the guide-edge will cut a groove 42 in the board, as shown in the cross-section (FIG. 5) immediately below. The inside dimension of a duct formed by the side included by this first continuous corner seam cut will be the same as that of the board lying between the right hand edge of the groove and the left hand edge of the rabbet, which in this instance will be 4 inches, as shown in the figure.

The second continuous corner seam is formed by a second groove cut 43 for which the guide-edge is positioned by placing the gauge over the first groove cut, aligning the end points of the appropriate spanning bracket directly above the upper edges of the groove, moving the T-square, with the measuring tape reel, to the left until the inside dimension of the duct, to be formed by this second side, in this instance, three inches, as indicated on the tape, coincides with the guide-edge 33. With the guide-edge in this position, the grooving tool 38, when moved across the board 25, and in contact with the guide-edge, will cut a groove located so that the distance between its right hand edge and the left hand edge of the prior groove, this distance equaling the inside dimension of the duct formed by this side will be three inches.

The third groove cut 44 (FIG. 10), that cut which will form the third continuous corner joint, is laid out and cut in similar manner to the above except that the side is to have an inside dimension of four inches to match the opposite first side.

Figures 8, 9, 10:
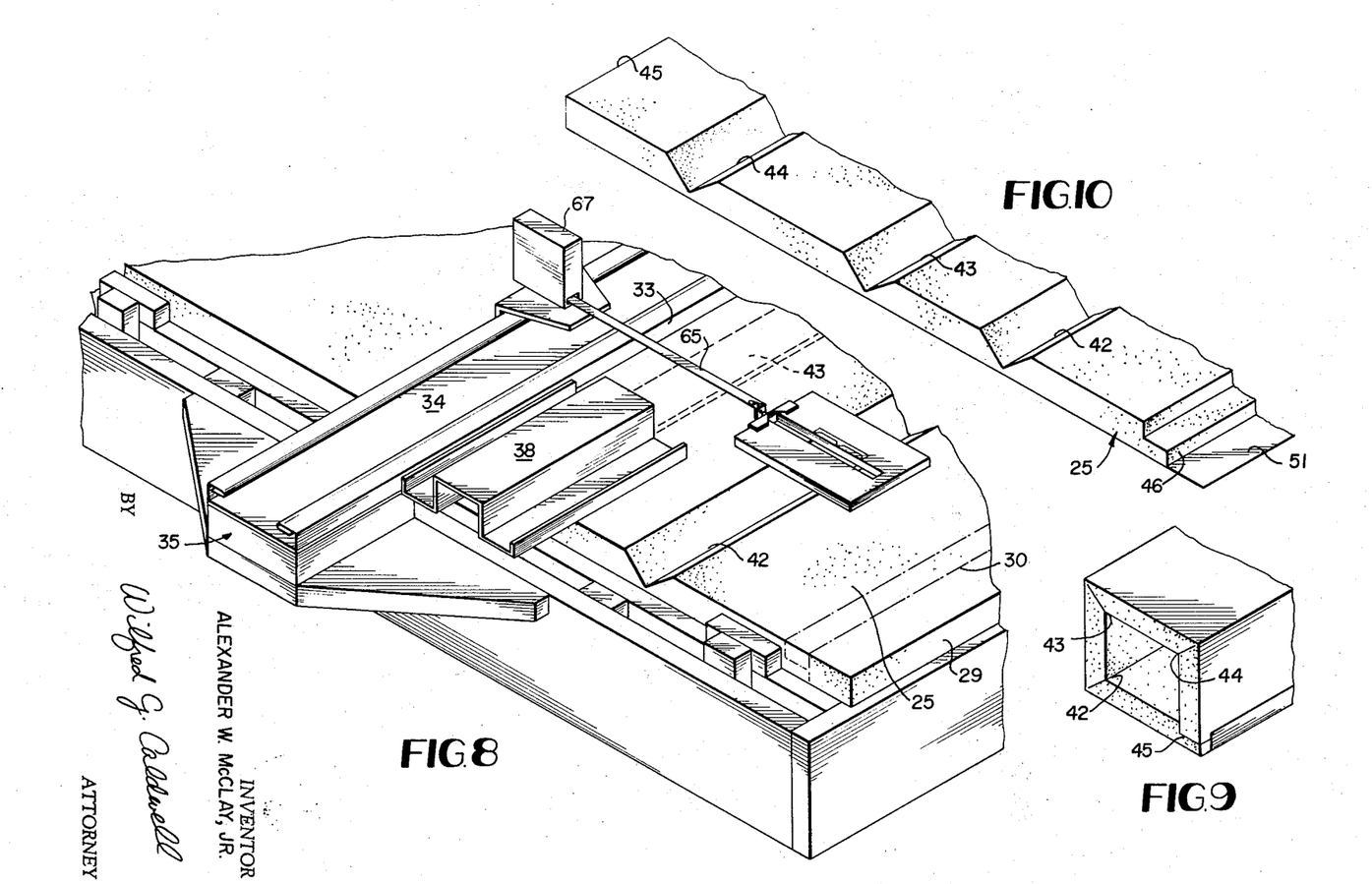
FIG. 8 is a view in perspective of the gauge, cutter and guide-edge in layout on the board.
FIG. 9 is a view in perspective of the duct made from the board of FIG. 8.
FIG. 10 is a view in perspective of the board cut to form the duct.

The next cut, the cut which will include the fourth side, must form a butt edge 45 to mate with the edge which is to be rabbeted along the first knife cut, to form the fourth corner joint, and the only non-continuous corner seam. Lay-out for this latter cut is made similarly to the above in that the gauge is placed above the prior groove with the end points of the appropriate spanning bracket in alignment therewith, the T-square, together with the measuring tape reel is moved to the left until the inside dimension of the duct, to be formed by this fourth side, in this instance, 3 inches—to match the second side—as indicated on the tape, coincides with the guide-edge 33. With the guide-edge in this position, a knife cut is made therealong, cutting through the board including the aluminum facing. The distance from the butt edge, thus cut, to the left hand edge of the prior groove will be three and one half inches. However, the butt edge is to be mated with the rabbeted first edge, and the rabbet cut will be one half inch in depth, this will yield a net inside duct dimension of three inches for this side, the required dimension.

A knife cut is now made along the beginning edge of the board, parallel to and immediately above the aluminum facing to cut away the fiber glass lying between the beginning edge and the first knife cut, thus leaving the stapling flap. Next, a special tool is moved across the board and in contact with the vertical face 46 formed by the first knife cut 30, making a rabbet cut adjacent to the upper surface of the board and to the first knife cut, thus completing the cuts for the longitudinal corner seams. The above rabbeting tool is now moved along one of the edges of the stretch-out, normal to the corner seam cuts, thus forming a rabbet (not shown) in this edge adjacent to the upper surface of the board, a second rabbeting tool is moved along the opposite edge, which cuts a rabbet along that edge and adjacent to the aluminum facing, these two latter cuts, after fabrication of the duct section, forming male and female rabbeted edges at either end of the section, thereby providing the means for joining one section of duct to another.

To fabricate the duct section it is now necessary to merely bring the sides up into position, mate the butt edge of the fourth side with the rabbeted edge of the first side, fold the stapling flap 51 over and onto the fourth side, staple it down and seal it with a special tape.

Figures 11, 13, 14:
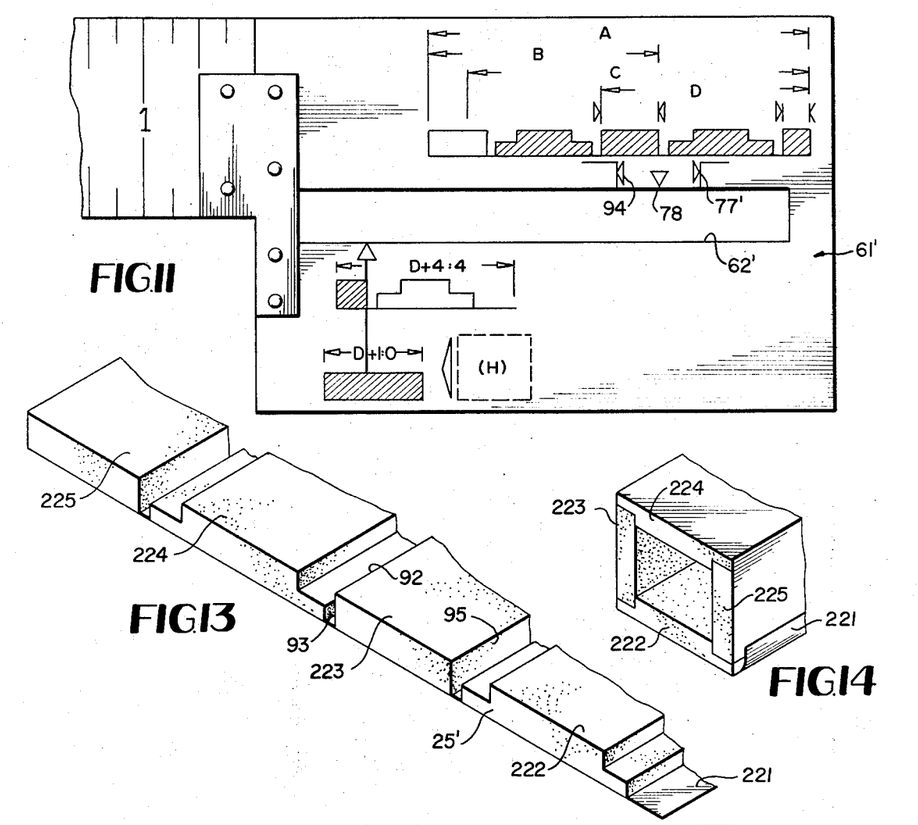
FIG. 11 is a plan view of a gauge for laying out ducts using modified ship-lap grooves for corner joints.
FIG. 13 is a perspective view of an insulating board in the stretchout position showing grooves therein which, when the duct is fabricated therefrom, will form modified ship-lap type corner seams.
FIG. 14 is a view in perspective of said duct.
Figure 12:
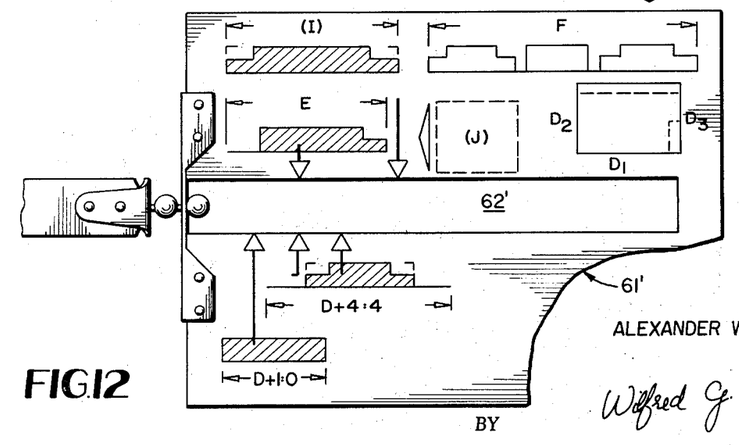
FIG. 12 is a reverse side of FIG. 11 but showing the use of a different measuring means in connection therewith.

In FIGS. 11 and 12 are shown a first and reverse side of a gauge which, except for the diagramatical data and certain locating marks shown thereon, is identical in every respect to the gauge of FIG. 1 together with its alternate means of attachment to a measuring tape, as shown in FIG. 2. It is used similarly and for the same purpose, i.e., to establish the position of a guide-edge for cutting tools used in the fabrication of fiber glass ducts and duct fittings, in terms of the required inside dimension of the duct or fitting, when measuring from an edge or the immediately prior cut.

However, unlike the gauge of FIGS. 1 and 2, the gauge of FIGS. 11 and 12 assumes the use of a grooving tool which cuts a groove formed by a butt edge on one side thereof, and a rabbeted edge on the other with the two edges separated a distance necessary to allow the butt edge to be fitted into the rabbet, when the board on the butt edge side of the groove is brought up into a position normal to the board on the other.

Sighting slot 62' is provided to enable the gauge 61' to be aligned with the edge or prior groove of the board for laying out successive modified ship-lap grooves. Thus, notation arrow 77' positions the gauge over a leading face of a prior butt edge side (such as 92 in FIG. 13) of a groove; arrow 78 will will then be aligned over the lower vertical face 93 of the adjacent rabbeted edge. Forward arrow notation 94 (FIG. 11) gauges from the butt edge facing in a trailing direction, such as 95 (FIG. 13).

Letters A through J (with the exception of G) of FIGS. 11 and 12 bear labels as follows:

A — one piece duct: D + 8:0
B — "U" section: D + 4:4
C — "U" section: D + 8:0
D — "L" section: D + 4:4
E — "L" filler $D_2$ + 2:6 (three flaps)
F — "T" or "L" wrapper $D_2$ + 5:2
H — same for "T" and "L" filler (two and three flaps)
I — "T" or "L" wrapper $D_1$ + 2:2
J — Cut "T" filler same as "L" filler except: subtr. $D_2 - D_3 - 1:0$ (only two flaps)

The foregoing applies to modified ship-lap cuts only.

In the manner heretofore explained and further set forth in my copending U.S. Pat. application Ser. No. 178,696 entitled Multiple Gauging Device for Modified Ship-Lap Corner Seams filed Sept. 8, 1971, and now abandoned; to fabricate the duct of FIG. 14 having sides corresponding to like numbered portions of board 25'.

What is claimed is:

1. A gauging means for positioning a straight-edge used to guide tools of both significant and insignificant widths, such as groove cutting tools and knives, used for incisive and groove cuts in structurable insulating board of appreciable thickness to form the corner joints of ducts, duct fittings, conduits, and box-like structures according to predetermined inside dimensions, said gauging means comprising a linear measurer having a zero reference point; a flat body gauge plate including at least one sighting slot; means of rotatably attaching the gauge plate to the measurer with the slot in alignment therewith; and at least one indicia located along the slot at a distance from the zero reference point substantially equal to one-half the width of the groove cutting tool plus twice the thickness of the board being structured for locating the position of the guide-edge in terms of finished inside dimensions of the structure progressively proceeding from groove to groove.

2. A gauging means for positioning a straight-edge used to guide tools of both significant and insignificant widths, such as groove cutting tools and knives, for incisive and groove cuts in structurable insulating board to form corner joints of ducts, duct fittings, conduits, or other box-like structures according to predetermined inside dimensions, said gauging means comprising a linear measurer having a zero reference point, a flat gauge plate containing a sighting slot located longitudinally of the plate, means for rotatably attaching the gauge plate to the zero reference end of the linear measurer so that the sighting slot is in alignment therewith and extending in a direction opposite thereto, to provide four edges defining the gauge plate slot in alignment with the linear measurer; locating marks and diagrams along at least three of said edges for positioning the gauge plate with reference to edges of, cuts or grooves in, said insulating board to longitudinally offset the linear measurer those distances which allow the linear measurer to indicate the position of the guide-edge in terms of the finished inside dimensions of the structure.

* * * * *